(12) United States Patent
Li et al.

(10) Patent No.: US 11,938,843 B2
(45) Date of Patent: *Mar. 26, 2024

(54) CHILD SAFETY SEAT

(71) Applicant: Bambino Prezioso Switzerland AG, Steinhausen (CH)

(72) Inventors: Ruyi Li, Guangdong (CN); Zu Jian Liu, Guangdong (CN)

(73) Assignee: Bambino Prezioso Switzerland AG, Steinhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,108

(22) Filed: Mar. 6, 2023

(65) Prior Publication Data

US 2023/0202349 A1 Jun. 29, 2023

Related U.S. Application Data

(63) Continuation of application No. 16/953,336, filed on Nov. 20, 2020, now Pat. No. 11,618,346.

(30) Foreign Application Priority Data

Nov. 25, 2019 (CN) .......................... 201911169275.7

(51) Int. Cl.
*B60N 2/26* (2006.01)
*B60N 2/00* (2006.01)
*B60N 2/28* (2006.01)
*G08B 21/24* (2006.01)

(52) U.S. Cl.
CPC ............. *B60N 2/002* (2013.01); *B60N 2/265* (2013.01); *G08B 21/24* (2013.01)

(58) Field of Classification Search
CPC ........... B60N 2/28; B60N 2/002; B60N 2/265
USPC .......................................... 297/250.1–256.16
See application file for complete search history.

(56) References Cited

U.S. PATENT DOCUMENTS

| | | |
|---|---|---|
| 5,581,234 A | 12/1996 | Emery |
| 5,711,574 A | 1/1998 | Barnes |
| 7,325,870 B2 | 2/2008 | Lawrence |
| 8,035,504 B2 | 10/2011 | White |
| 8,816,845 B2 | 8/2014 | Hoover |
| 9,751,433 B2 | 9/2017 | Juchniewicz |
| 11,618,346 B2 * | 4/2023 | Li ........................ B60N 2/265 297/250.1 |

(Continued)

FOREIGN PATENT DOCUMENTS

| | | |
|---|---|---|
| CN | 103786608 B | 9/2016 |
| CN | 207790407 U | 8/2018 |

(Continued)

*Primary Examiner* — Rodney B White
(74) *Attorney, Agent, or Firm* — Winston Hsu (57) ABSTRACT

A child safety seat is provided and includes a seat body, a driving portion and a detection mechanism. The driving portion is rotatably connected to the seat body. The detection mechanism includes a detector and a trigger mechanism. The detector is in a non-working state when the trigger mechanism is in an open state. The detector is in a working state when the trigger mechanism is in a closed state. The driving portion is rotatably operated to switch the trigger mechanism from the open state to the closed state, so as to switch the detector to the working state. The child safety seat can prevent a dangerous scenario where a child is left in a car.

15 Claims, 13 Drawing Sheets

(56) References Cited

U.S. PATENT DOCUMENTS

| | | |
|---|---|---|
| 2003/0062996 A1 | 4/2003 | Flanagan |
| 2007/0273524 A1 | 11/2007 | Lee |
| 2008/0309493 A1 | 12/2008 | Lee |
| 2012/0049495 A1 | 3/2012 | Harris |
| 2014/0052342 A1 | 2/2014 | Seibert |
| 2014/0253313 A1 | 9/2014 | Schoenberg |
| 2016/0207497 A1 | 7/2016 | Seal |
| 2016/0304004 A1 | 10/2016 | Sandbothe |
| 2018/0279803 A1 | 10/2018 | Bailliard |
| 2019/0152345 A1 | 5/2019 | Oranges |
| 2020/0094709 A1 | 3/2020 | Dutkin |
| 2020/0156589 A1 | 5/2020 | Babin |
| 2020/0384893 A1 | 12/2020 | Dillinger |
| 2020/0405078 A1 | 12/2020 | Martin |
| 2021/0056827 A1 | 2/2021 | Klamt |
| 2021/0155200 A1 | 5/2021 | Li |

FOREIGN PATENT DOCUMENTS

| | | |
|---|---|---|
| CN | 110171327 A | 8/2019 |
| CN | 110450684 A | 11/2019 |
| CN | 210792882 U | 6/2020 |
| DE | 20 2017 106 647 U1 | 2/2019 |
| EP | 2 774 130 A1 | 9/2014 |
| FR | 3 021 276 A1 | 11/2015 |
| WO | 2012/116354 A2 | 8/2012 |
| WO | 2012/116354 A3 | 3/2013 |
| WO | 2013/064877 A1 | 5/2013 |
| WO | 2017/004587 A1 | 1/2017 |
| WO | 2017/105486 A1 | 6/2017 |

\* cited by examiner

CHILD SAFETY SEAT

CROSS REFERENCE TO RELATED APPLICATIONS

This application is a continuation application of U.S. application Ser. No. 16/953,336, filed on Nov. 20, 2020, now U.S. Pat. No. 11,618,346 B2. The content of the application is incorporated herein by reference.

BACKGROUND OF THE INVENTION

1. Field of the Invention

The present invention relates to a child safety seat, and more specifically, to a child safety seat capable of preventing a dangerous scenario where a child is left in a car.

2. Description of the Prior Art

With the increase of family sedans, more and more families choose to travel together. Although travelling by car is convenient, the issue of child safety and protection in the car is getting more and more important. Since there are more and more child deaths due to traffic accidents, child safety seats are designed for solving the aforementioned problem. The child safety seats can reduce injuries on children. However, people might leave their child in cars due to negligence, which brings safety hazards to the child, in severe cases the child may suffocate and die.

Therefore, there is an urgent need to solve the aforementioned problem.

SUMMARY OF THE INVENTION

It is an objective of the present invention to provide a child safety seat capable of preventing a dangerous scenario where a child is left in a car.

In order to achieve the aforementioned objective, the present invention discloses a child safety seat. The child safety seat includes a seat body, a driving portion and a detection mechanism. The driving portion is rotatably connected to the seat body. The detection mechanism includes a detector and a trigger mechanism. The detector is in a non-working state when the trigger mechanism is in an open state. The detector is in a working state when the trigger mechanism is in a closed state, and the driving portion is rotatably operated to switch the trigger mechanism from the open state to the closed state, so as to switch the detector to the working state.

According to an embodiment of the present invention, the child safety seat includes a crotch strap and a crotch strap buckle assembly connected to the crotch strap. The detection mechanism is disposed on the seat body. The driving portion is connected to the crotch strap, and buckling of the crotch strap buckle assembly drives the driving portion to rotates to switch the trigger mechanism to the closed state.

According to an embodiment of the present invention, the driving portion includes a driving component, a rotating component connected to the driving component, and a pushing protrusion disposed on the rotating component. The rotating component is rotatably connected to the seat body. The driving component is connected to the crotch strap, and when the crotch strap buckle assembly is buckled, the driving component is driven to rotate the rotating component, so as to drive the pushing protrusion to push the trigger mechanism to switch to the closed state.

According to an embodiment of the present invention, the child safety seat further includes a resilient portion, and the resilient portion constantly drives the pushing protrusion to move away from the trigger mechanism.

According to an embodiment of the present invention, the child safety seat further includes a sensing device configured to sense a state of the child safety seat and compare the state of the child safety seat with a predetermined trigger criterion, and when the state of the child safety seat meets the predetermined trigger criterion, the child safety seat confirms that the child is seated in the seat body.

According to an embodiment of the present invention, the predetermined trigger criterion is that the child safety seat receives a pressure or a buckle assembly of the child safety seat is buckled.

According to an embodiment of the present invention, the pushing protrusion is an arc-shaped structure.

According to an embodiment of the present invention, the crotch strap buckle assembly includes a male buckle and a female buckle. Buckling of the crotch strap buckle assembly is achieved by buckling of the male buckle and the female buckle, and the buckling of the male buckle and the female buckle drives the driving portion to switch the detector to the working state.

According to an embodiment of the present invention, the driving portion is a conductor. The driving portion is disposed on the male buckle. A power source circuit is disposed on the female buckle and is electrically connected with the detector, and the buckling of the male buckle and the female buckle electrically connects the detector with the power source circuit by the driving portion.

According to an embodiment of the present invention, the driving portion is a conductor. The driving portion is disposed on the female buckle. A power source circuit is disposed on the male buckle and for electrically connecting with the detector, and the buckling of the male buckle and the female buckle electrically connects the detector with the power source circuit by the driving portion.

According to an embodiment of the present invention, the power source circuit is an open circuit, and the buckling of the male buckle and the female buckle electrically connects the conductor with the power source circuit.

According to an embodiment of the present invention, the power source circuit is an open circuit, and the buckling of the male buckle and the female buckle electrically connects the conductor with the power source circuit.

According to an embodiment of the present invention, the child safety seat further includes a linking component, and buckling of the crotch strap buckle assembly moves the driving portion by the linking component.

According to an embodiment of the present invention, the trigger mechanism is a switch connected to a wire. An end of the wire is connected to the detector. The driving portion drives the switch to switch between the closed state and the open state, and therefore, the detector is switched between the working state and the non-working state.

In order to achieve the aforementioned objective, the present invention further discloses a child safety seat. The child safety seat includes a seat body, a driving portion, a detection mechanism, a crotch strap and a crotch strap buckle assembly. The driving portion is movably connected to the seat body. The detection mechanism includes a detector and a trigger mechanism. The detector is in a non-working state when the trigger mechanism is in an open state. The detector is in a working state when the trigger mechanism is in a closed state. The crotch strap buckle assembly is connected to the crotch strap. The driving portion is connected to the crotch strap, and buckling of the crotch strap buckle assembly drives the driving portion to move to switch the trigger mechanism to the closed state, so as to switch the detector to the working state.

The detailed description and the accompanying drawings are provided as follows to illustrate to the present invention. The accompanying drawings are used to explain the embodiment of the present invention.

REFERENCE SIGNS

Child safety seat 10, base 11, seat body 12, alarming device 20, key chain 21, detection mechanism 30, detector 31, trigger mechanism 33, mounting plate 35, power source portion 37, driving portion 40, driving component 41, rotating component 43, pushing protrusion 45, linking component 50, wire 60, crotch strap buckle assembly 70, male buckle 71, female buckle 72, left male buckle 711, right male buckle 713, power source circuit 80, power source 81.

DETAILED DESCRIPTION

Detailed description of the embodiments of the present invention is illustrated with the accompanying drawings. Similar components are marked with similar reference numerals in the drawings.

Please refer to FIG. 1 to FIG. 6. A child safety seat alarm system of the present invention includes a child safety seat 10, an alarming device 20, a detection mechanism 30 and a driving portion 40. The child safety seat 10 is for a child to be seated therein. The alarming device 20 is configured to receive a signal and output an alarm signal. The detection mechanism 30 includes a detector 31 and a trigger mechanism 33. The detector 31 is configured to detect whether states of the alarming device 20 and the detector 31 meet a predetermined criterion. The detector 31 is in a non-working state when the trigger mechanism 33 is in an open state, and the detector 31 is in a working state when the trigger mechanism 33 is in a closed state. When the child is seated in the child safety seat 10, the driving portion 40 is operated to switch the trigger mechanism 33 from the open state to the closed state so as to switch the detector 31 to the working state. When the detector 31 detects that the states of the alarming device 20 and the detector 31 meet the predetermined criterion, the alarming device 20 outputs the alarm signal for alarming. The child safety seat 10 includes a base 11 and a seat body 12. In an embodiment, the detection mechanism 30 and the driving portion 40 are disposed on the seat body 12, i.e., the detection mechanism and the driving portion 40 can be considered to be elements of the child safety seat 10. However, the present invention is not limited thereto.

The predetermined criterion can be a predetermined distance. The detector 31 can be configured to detect a distance between the alarming device 20 and the detector 31. For example, the predetermined distance can be set to 5 meters, and when the detector 31 detects that the distance between the alarming device 20 and the detector 31 is greater than 5 meters, the alarming device 20 can output the alarm signal for alarming. However, the present invention is not limited thereto. The predetermined distance can be set according to practical demands. Furthermore, the predetermined criterion can be a predetermined time. For example, when the detector 31 detects a period of that a driver leaves a car is greater than the predetermined time, the alarming device 20 can output the alarm signal for alarming. Therefore, the predetermined criterion is not limited to the aforementioned situation.

Moreover, the child safety seat alarm system further includes a sensing device, which is not shown in the figures, configured to sense a state of the child safety seat 10 and compare the state of the child safety seat 10 with a predetermined trigger criterion. When the state of the child safety seat 10 meets the predetermined trigger criterion, the child safety seat 10 of the child safety seat alarm system confirms that the child is seated in the seat body 12 of the child safety seat 10. The sensing device can commonly include a pressure sensor or a gravity sensor. The predetermined trigger criterion can be that the child safety seat 10 receives a pressure or a buckle assembly of the child safety seat 10 is buckled. For example, a pressure value received by the child safety seat 10 can be detected by the pressure sensor, and when the detected pressure value is greater than a predetermined value, the child safety seat alarm system can determine that the child is seated in the child safety seat 10. Furthermore, for example, when the buckle assembly of the child safety seat 10 is buckled, the child safety seat alarm system also can determine that the child is seated in the child safety seat 10. Specifically, the child safety seat 10 includes a crotch strap and a crotch strap buckle assembly connected to the crotch strap, and buckling of a buckle assembly of the child safety seat 10 is achieved by buckling of the crotch strap buckle assembly. When the predetermined trigger criterion is met, the child safety seat 10 of the child safety seat alarm system confirms that the child is seated in the seat body 12 of the child safety seat 10.

Figure 1:
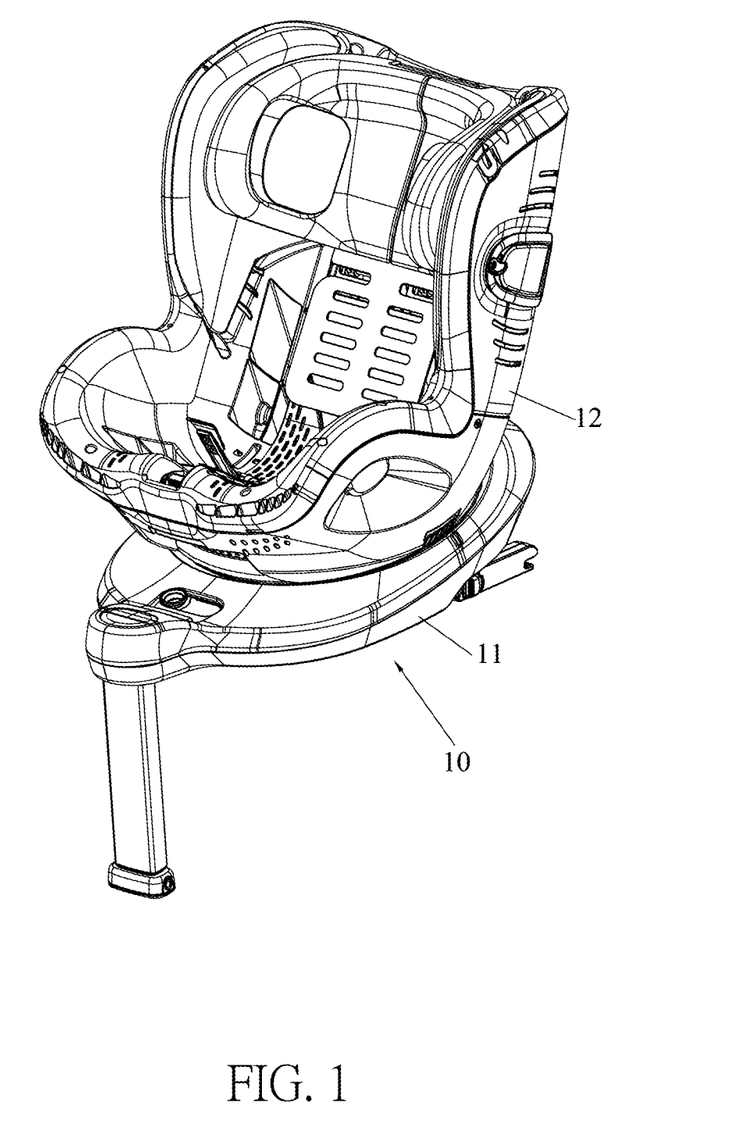
FIG. 1 is a structural diagram of a child safety seat alarm system without illustrating an alarming device according to an embodiment of the present invention.
Figure 2:
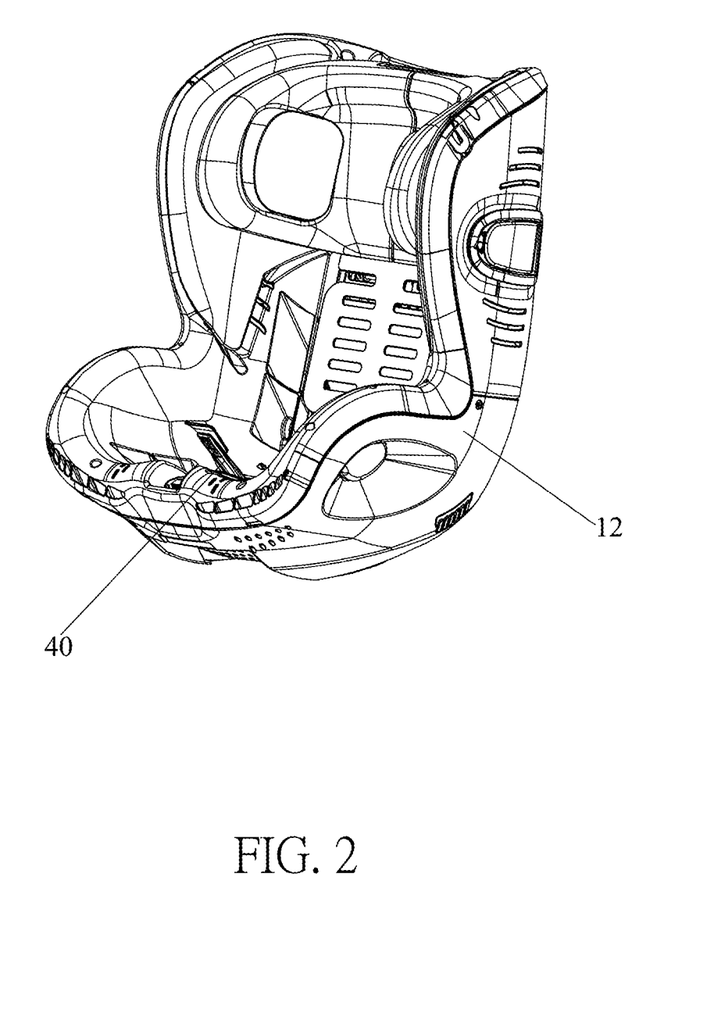
FIG. 2 is a structural diagram of the child safety seat alarm system without illustrating a base according to the embodiment of FIG. 1 of the present invention.
Figure 3:
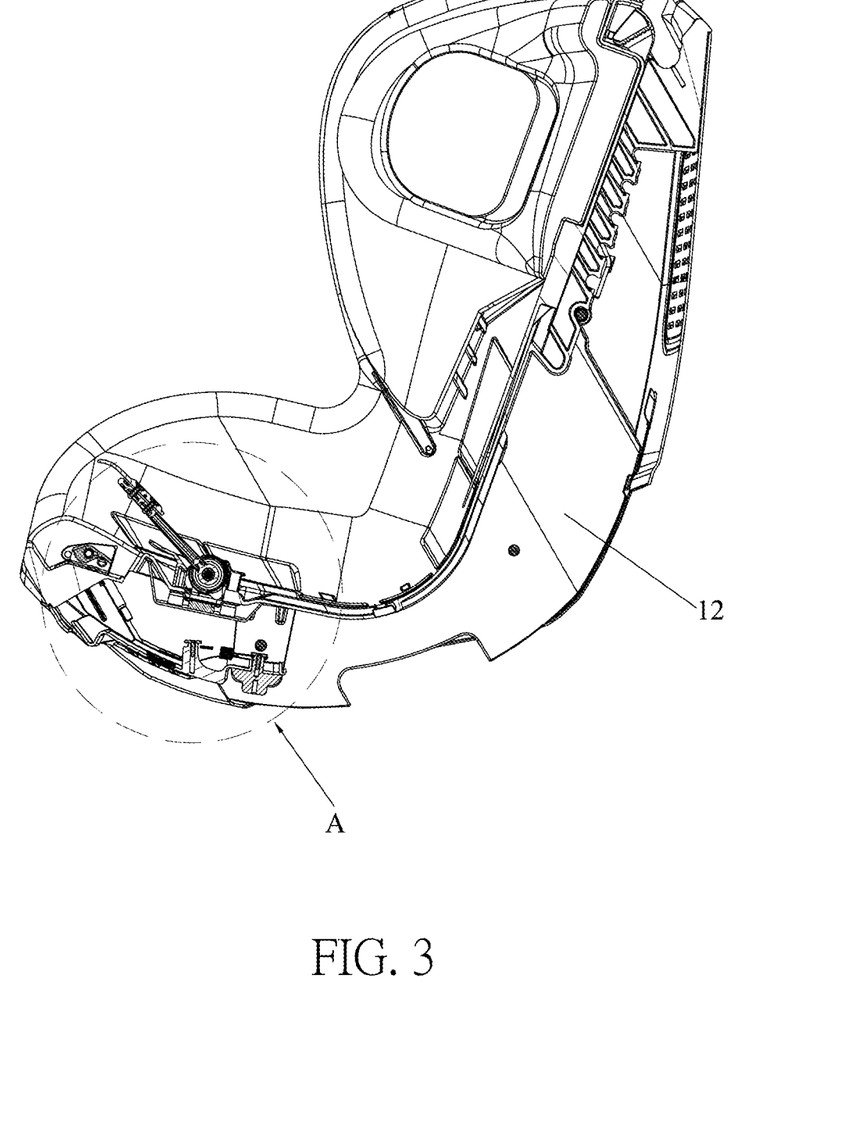
FIG. 3 is a sectional diagram of the child safety seat alarm system according to the embodiment of FIG. 2 of the present invention.
Figure 4:
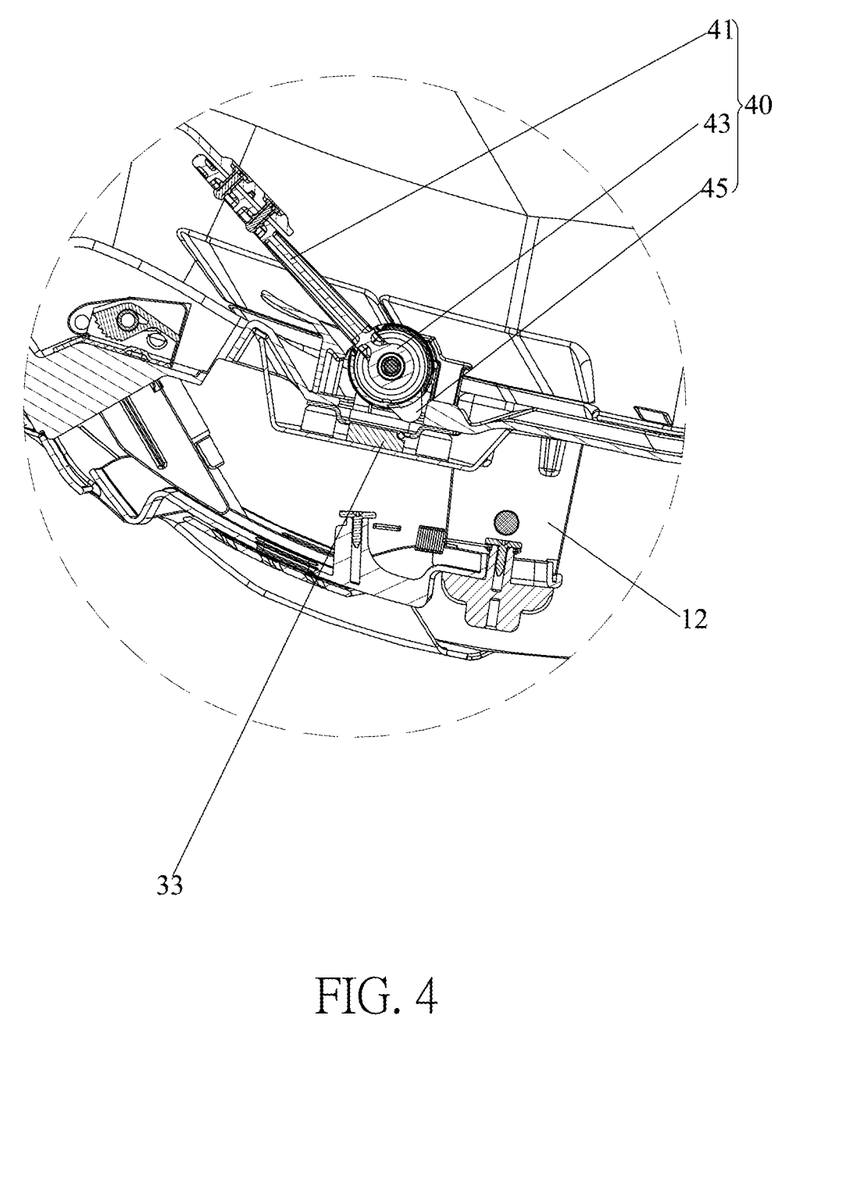
FIG. 4 is an enlarged diagram of an A portion according to the embodiment of FIG. 3 of the present invention.
Figure 7:
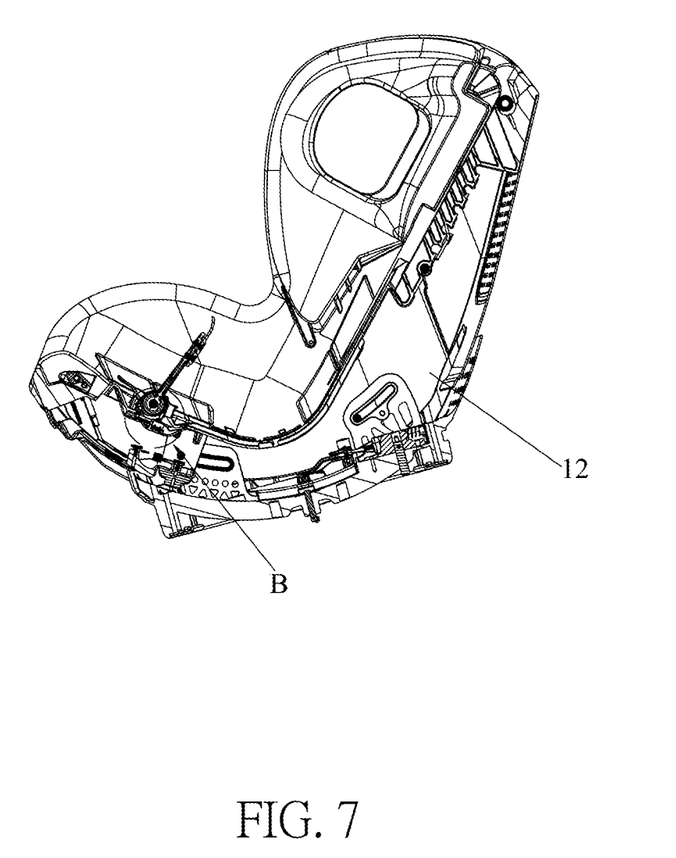
FIG. 7 is a structural diagram of a pushing protrusion of the child safety seat alarm system according to another embodiment of the present invention.
Figure 8:
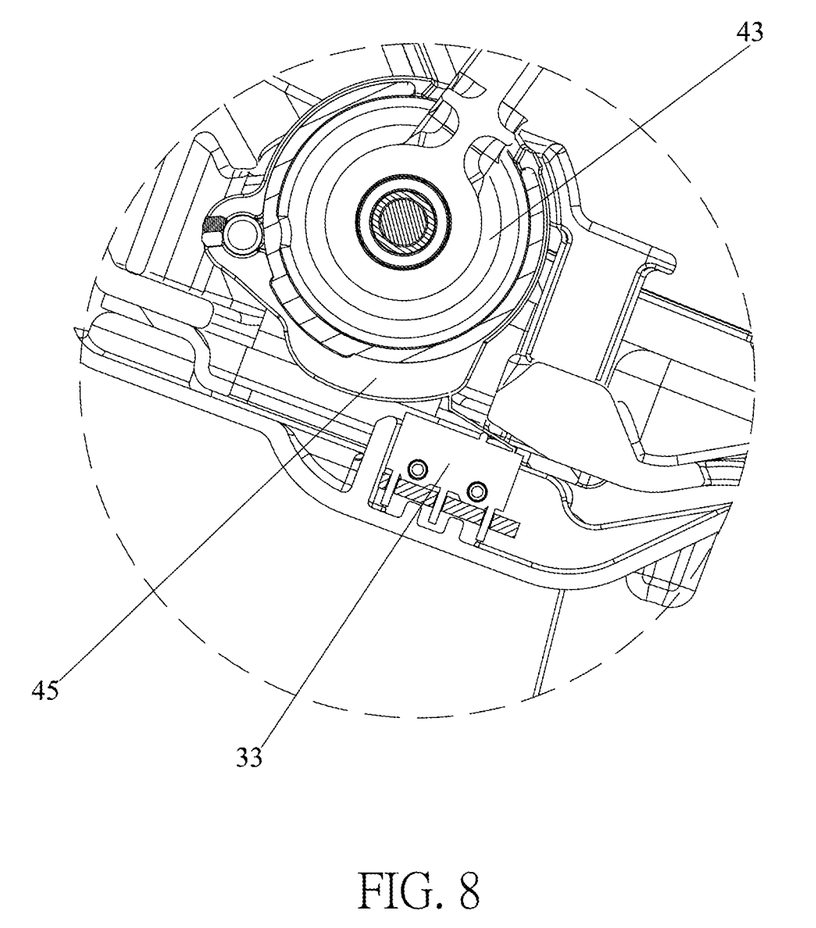
FIG. 8 is an enlarged diagram of a B portion according to the embodiment of FIG. 7 of the present invention.

Please refer to FIG. 3 to FIG. 4. The detection mechanism 30 is disposed on the seat body 12 of the child safety seat 10. The driving portion 40 is movably disposed or connected to the seat body 12 and connected to the crotch strap, and the buckling of the crotch strap buckle assembly drives the driving portion 40 to move to switch the trigger mechanism 33 to the closed state. In other words, when the crotch strap buckle assembly is buckled, the trigger mechanism 33 can be closed. The trigger mechanism 33 in the closed state can electrically conduct the alarming device 20 with the detector 31 to switch the alarming device 20 and the detector 31 to the working state. Furthermore, the driving portion 40 is rotatably connected to the child safety seat 10. The crotch strap drives the driving portion 40 to rotate around the child safety seat 10 to switch the trigger mechanism 33 to the closed state. Specifically, the driving portion 40 includes a driving component 41, a rotating component 43 connected to the driving component 41 and a pushing protrusion 45 disposed on the rotating component 43. The rotating component 43 is rotatably connected to the child safety seat 10. The driving component 41 is connected to the crotch strap. When the crotch strap buckle assembly is buckled, the driving component 41 is driven to rotate the rotating component 43, so as to drive the pushing protrusion 45 to push the trigger mechanism 33 to switch to the closed state. In order to extend a service life of the driving portion 40, the driving component 41, the rotating component 43 and the pushing protrusion 45 can be integrally formed together. In a preferred embodiment, the pushing protrusion 45 can be an arc-shaped structure, as shown in FIG. 7 and FIG. 8. Besides, the child safety seat alarm system further includes a resilient portion (not shown in the figures). The resilient portion drives the pushing protrusion 45 to move away from the trigger mechanism 33. When the crotch strap buckle assembly is buckled, a resilient force of the resilient portion is overcome, so that the driving component 41 drives the rotating component 43 to rotate about the child safety seat 10, and therefore, the pushing protrusion 45 drives the trigger mechanism 33 to be in the closed state.

Figure 5:
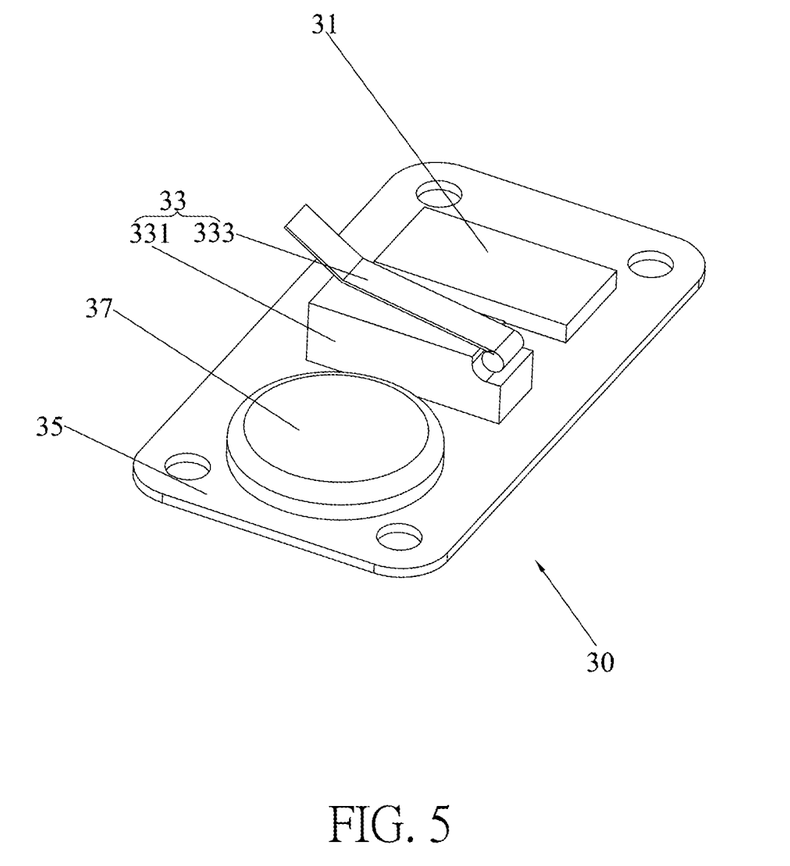
FIG. 5 is a structural diagram of a detection mechanism of the child safety seat alarm system according to the embodiment of FIG. 4 of the present invention.

Please refer to FIG. 5. The detection mechanism 30 further includes amounting plate 35 and a power source portion 37. The power source portion 37, the detector 31, and the trigger mechanism 33 are disposed on the mounting plate 35. The power source portion 37 is configured to provide electricity for the detector 31. When the trigger mechanism 33 is in the open state, the power source portion 37 does not provide electricity for the detector 31, and when the trigger mechanism 33 is in the closed state, the power source portion 37 provides electricity for the detector 31. The detector 31 can be a distance measuring device which includes a signal processing unit and an emitting unit. Detailed description is omitted herein for simplicity. Furthermore, the trigger mechanism 33 includes a switch body 331 and a resilient contacting arm 333. The resilient contacting arm 333 is disconnected from the switch body 331 to switch the trigger mechanism 33 to the open state. The resilient contacting arm 333 is pushed by the pushing protrusion 45 to abut against the switch body 331, and therefore, the trigger mechanism 33 is switched to the closed state.

Figure 6:
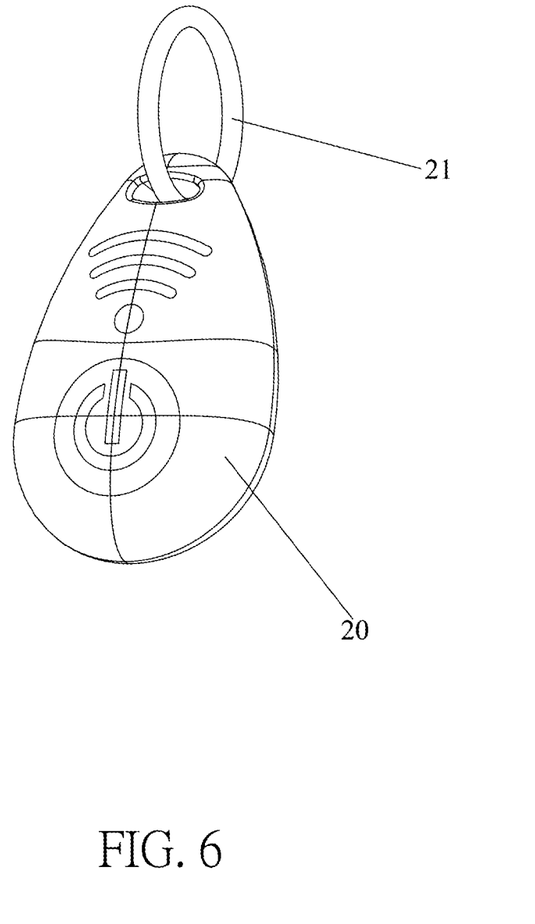
FIG. 6 is a structural diagram of the alarming device according to an embodiment of the present invention.

Please refer to FIG. 6. The alarming device 20 can be an independent component. For example, the alarming device 20 includes a key chain 21, so that the alarming device 20 can be connected with a car key of a user for the user to take the car key with the alarming device 20. Besides, for example, the alarming device 20 can be installed on a mobile terminal of a user. Specifically, the mobile terminal can be a mobile phone, an IPAD, an in-car apparatus, an intelligent television, a card key, a smart key or any other electronic device which is capable of emitting sound and/or light and/or displaying images. In this embodiment, the mobile terminal is the mobile phone, and is capable of both receiving the signal transmitted from the detector 31 and outputting the alarm signal when a corresponding application software is installed in the mobile phone.

Figure 9:
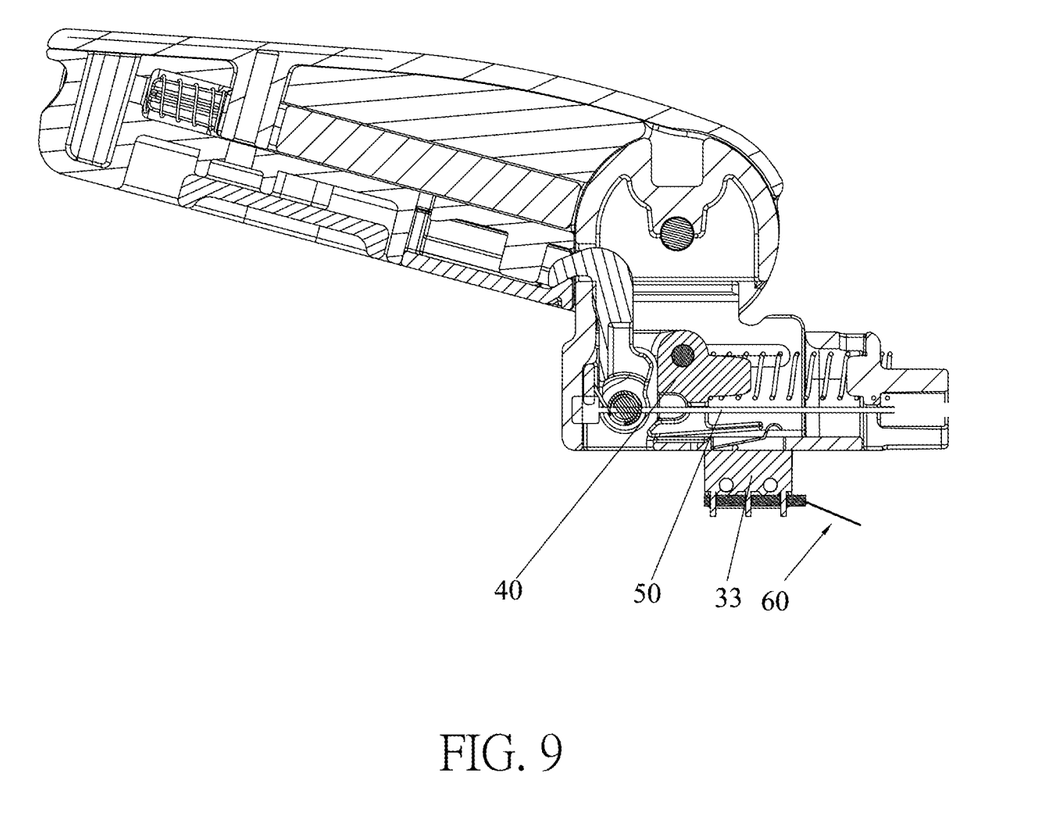
FIG. 9 is a structural diagram of a trigger mechanism of the child safety seat alarm system as the trigger mechanism is in an open state according to another embodiment of the present invention.
Figure 10:
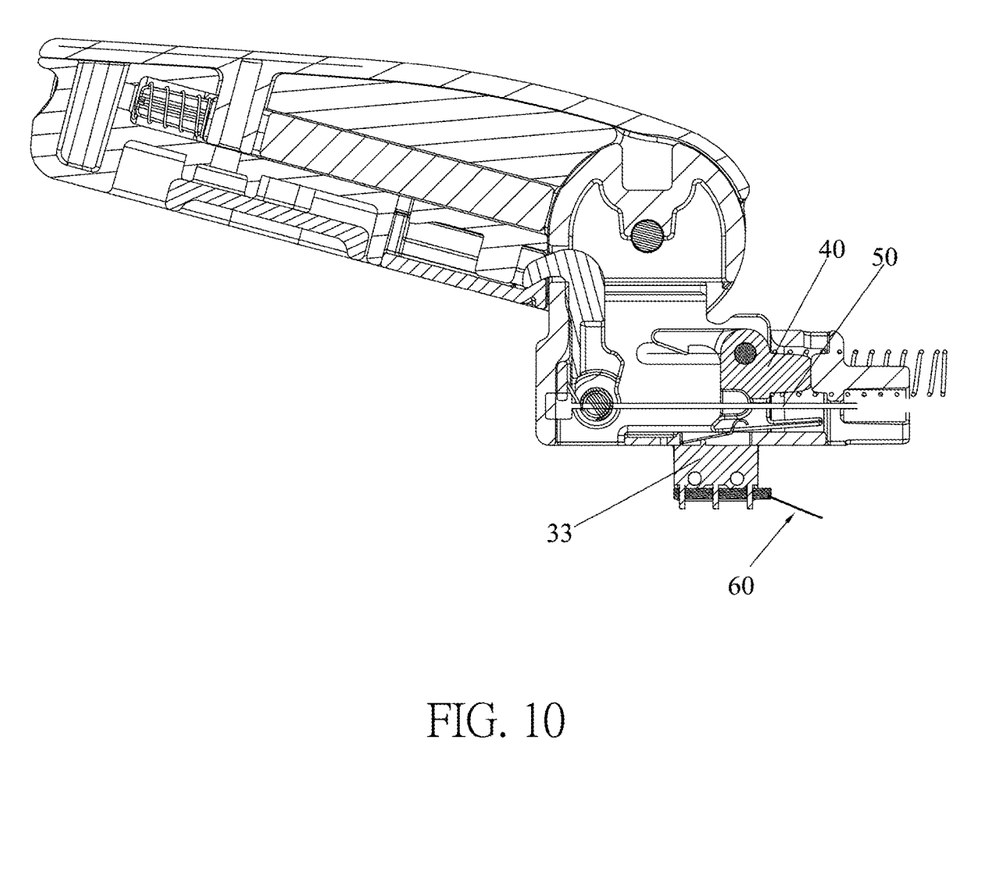
FIG. 10 is a structural diagram of the trigger mechanism of the child safety seat alarm system as the trigger mechanism is in a closed state according to the embodiment of FIG. 9 of the present invention.

Please refer to FIG. 9 to FIG. 10. The child safety seat alarm system further includes a linking component 50, and the buckling of the crotch strap buckle assembly drives the driving portion 40 to move by the linking component 50. For example, the linking component 50 can be a steel wire. After a male buckle and a female buckle are buckled, the driving portion 40 is driven by the linking component 50 to switch the trigger mechanism to the closed state. Specifically, in this embodiment, the trigger mechanism 33 is a switch connected to a wire 60. An end of the wire 60 is connected to the detector 31. The driving portion 40 drives the switch to be in the closed state or the open state, and therefore, the detector 31 is switched between the working state and the non-working state.

Figure 11:
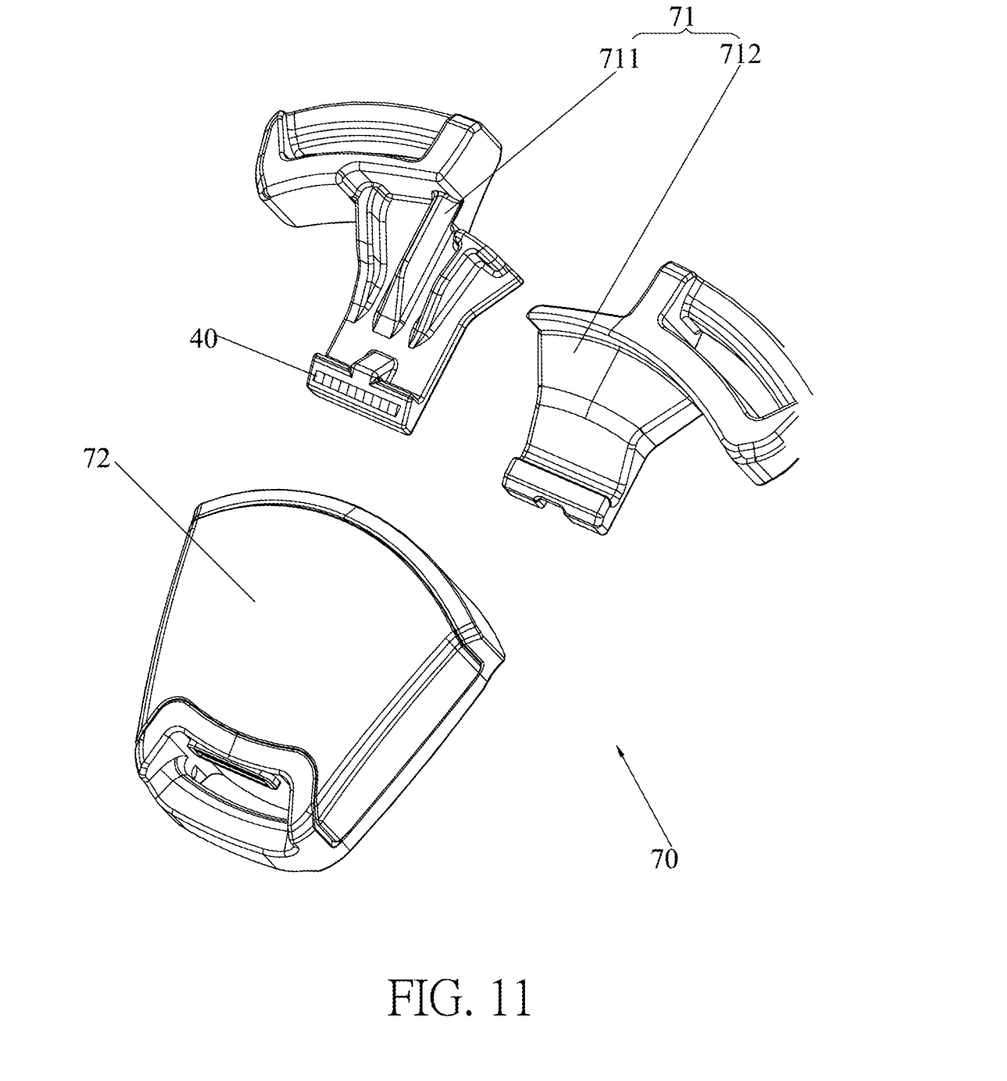
FIG. 11 is a structural diagram of the child safety seat alarm system according to another embodiment of the present invention.
Figure 12:
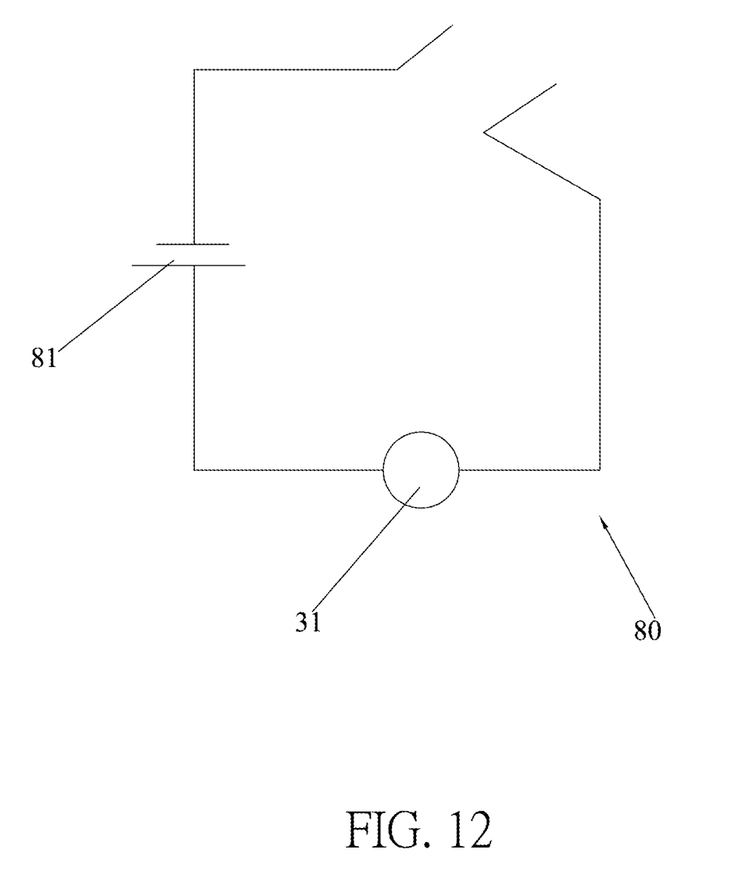
FIG. 12 is a diagram of a power source circuit of the child safety seat alarm system as the power source circuit is open according to the embodiment of FIG. 11 of the present invention.
Figure 13:
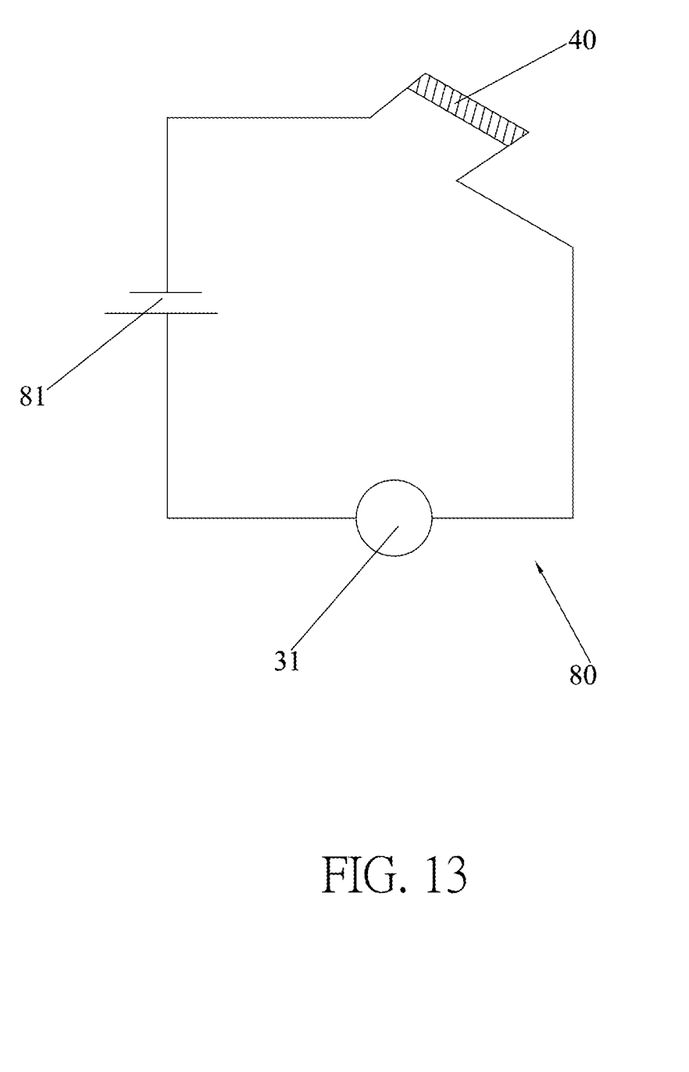
FIG. 13 is a diagram of the power source circuit of the child safety seat alarm system as the power source circuit is closed according to the embodiment of FIG. 11 of the present invention.

Please refer to FIG. 11 to FIG. 13. In an embodiment, a crotch strap buckle assembly 70 includes a male buckle 71 and a female buckle 72. Buckling of the crotch strap buckle assembly 70 is achieved by buckling of the male buckle 71 and the female buckle 72, and the buckling of the male buckle 71 and the female buckle 72 drives the driving portion 40 to switch the detector 31 to the working state. The child safety seat alarm system further includes a power source circuit 80. The detector 31 is disposed on the power source circuit 80. A power source 81 is disposed on the power source circuit 80 for providing electricity for the detector 31. Understandably, the power source 81 can be a power socket or a battery. Furthermore, the driving portion 40 can be a conductor. The driving portion 40 is disposed on the male buckle 71. The power source circuit 80, which can be electrically connected to the detector 31, is disposed on the female buckle 72. The buckling of the male buckle 71 and the female buckle 72 electrically connects the detector 31 with the power source circuit 80 by the driving portion 40. Specifically, the power source circuit 80 is an open circuit, and the buckling of the male buckle 71 and the female buckle 72 electrically connects the conductor with the power source circuit 80. That is, the buckling of the male buckle 71 and the female buckle 72 closes the power source circuit 80 by the conductor. As shown in FIG. 11, the male buckle 71 includes a left male buckle 711 and a right male buckle 713. The conductor is disposed on the left male buckle 711 and/or the right male buckle 713. Detailed description is omitted herein for simplicity. Furthermore, the driving portion 40 also can be disposed on the female buckle 72. The power source circuit 80, which can be electrically connected to the detector 31, is disposed on the male buckle 71. By using the driving portion 40, the buckling of the male buckle 71 and the female buckle 72 enables the detector 31 to be in electrical connection with the power source circuit 80. Detailed description can be seen in the aforementioned description on the male buckle 71, and therefore, is omitted herein for simplicity.

Please refer to FIG. 1 to FIG. 13. The operation principle of the child safety seat alarm system is described as follows.

After the child is seated in the child safety seat 10, the crotch strap buckle assembly can be buckled to drive the driving component 41 to rotate the rotating component 43, so that the pushing protrusion 45 is driven by the rotating component 43 to switch the trigger mechanism 33 from the open state to the closed state. The trigger mechanism 33 in the closed state electrically connects the detector 31 with the power source portion 37, and therefore, both the detector 31 and the alarming device 20 are in the working state. When the detector 31 detects that the distance between the alarming device 20 and the detector 31 is greater than the predetermined distance, the alarming device 20 outputs the alarm signal for alarming to remind the user that the child is left in a car.

In contrast to the prior art, when the child safety seat 10 of the child safety seat alarm system of the present invention confirms that the child is seated in the seat body 12 of the child safety seat 10, the driving portion 40 is operated to switch the trigger mechanism 33 from the open state to the closed state so as to switch the detector 31 to the working state. Furthermore, when the detector 31 detects that the states of the alarming device 20 and the detector 31 meet the predetermined criterion, the alarming device 20 outputs the alarm signal for alarming to remind the user that the child is left in a car. This prevents a dangerous scenario where the child is left in the car.

The detailed description is provided to illustrate a preferred embodiment of the present invention. However, the present invention is not limited to the aforementioned embodiment. Any modification or any equivalent combination which is made according to the nature of the present invention should be included in the scope of the invention.

What is claimed is:

1. A child safety seat comprising:
a seat body;
a driving portion rotatably connected to the seat body; and
a detection mechanism comprising a detector and a trigger mechanism, the detector being in a non-working state when the trigger mechanism is in an open state, the detector being in a working state when the trigger mechanism is in a closed state, and the driving portion being rotatably operated to switch the trigger mechanism from the open state to the closed state, so as to switch the detector to the working state.

2. The child safety seat of claim 1, wherein the child safety seat comprises a crotch strap and a crotch strap buckle assembly connected to the crotch strap, the detection mechanism is disposed on the seat body, the driving portion is connected to the crotch strap, and buckling of the crotch strap buckle assembly drives the driving portion to rotates to switch the trigger mechanism to the closed state.

3. The child safety seat of claim 2, wherein the driving portion comprises a driving component, a rotating component connected to the driving component, and a pushing protrusion disposed on the rotating component, the rotating component is rotatably connected to the seat body, the driving component is connected to the crotch strap, and when the crotch strap buckle assembly is buckled, the driving component is driven to rotate the rotating component, so as to drive the pushing protrusion to push the trigger mechanism to switch to the closed state.

4. The child safety seat of claim 3, wherein the child safety seat further comprises a resilient portion, and the resilient portion constantly drives the pushing protrusion to move away from the trigger mechanism.

5. The child safety seat of claim 3, wherein the pushing protrusion is an arc-shaped structure.

6. The child safety seat of claim 1, wherein the child safety seat further comprises a sensing device configured to sense a state of the child safety seat and compare the state of the child safety seat with a predetermined trigger criterion, and when the state of the child safety seat meets the predetermined trigger criterion, the child safety seat confirms that the child is seated in the seat body.

7. The child safety seat of claim 6, wherein the predetermined trigger criterion is that the child safety seat receives a pressure or a buckle assembly of the child safety seat is buckled.

8. The child safety seat of claim 6, wherein the crotch strap buckle assembly comprises a male buckle and a female buckle, buckling of the crotch strap buckle assembly is achieved by buckling of the male buckle and the female buckle, and the buckling of the male buckle and the female buckle drives the driving portion to switch the detector to the working state.

9. The child safety seat of claim 8, wherein the driving portion is a conductor, the driving portion is disposed on the male buckle, a power source circuit is disposed on the female buckle and is electrically connected with the detector, and the buckling of the male buckle and the female buckle electrically connects the detector with the power source circuit by the driving portion.

10. The child safety seat of claim 9, wherein the power source circuit is an open circuit, and the buckling of the male buckle and the female buckle electrically connects the conductor with the power source circuit.

11. The child safety seat of claim 8, wherein the driving portion is a conductor, the driving portion is disposed on the female buckle, a power source circuit is disposed on the male buckle and for electrically connecting with the detector, and the buckling of the male buckle and the female buckle electrically connects the detector with the power source circuit by the driving portion.

12. The child safety seat of claim 11, wherein the power source circuit is an open circuit, and the buckling of the male buckle and the female buckle electrically connects the conductor with the power source circuit.

13. The child safety seat of claim 6, wherein the child safety seat further comprises a linking component, and buckling of the crotch strap buckle assembly moves the driving portion by the linking component.

14. The child safety seat of claim 13, wherein the trigger mechanism is a switch connected to a wire, an end of the wire is connected to the detector, the driving portion drives the switch to switch between the closed state and the open state, and therefore, the detector is switched between the working state and the non-working state.

15. A child safety seat comprising:
a seat body;
a driving portion movably connected to the seat body;
a detection mechanism comprising a detector and a trigger mechanism, the detector being in a non-working state when the trigger mechanism is in an open state, and the detector being in a working state when the trigger mechanism is in a closed state;
a crotch strap; and
a crotch strap buckle assembly connected to the crotch strap;
wherein the driving portion is connected to the crotch strap, and buckling of the crotch strap buckle assembly drives the driving portion to move to switch the trigger mechanism to the closed state, so as to switch the detector to the working state.

* * * * *